US011900509B2

(12) United States Patent
Kuromi et al.

(10) Patent No.: US 11,900,509 B2
(45) Date of Patent: Feb. 13, 2024

(54) IMAGE PROCESSING METHOD FOR A COMPUTER TO ASSIST A USER IN ASSESSMENT OF A CULTURED EMBRYO

(71) Applicants: SCREEN HOLDINGS CO., LTD., Kyoto (JP); NATIONAL UNIVERSITY CORPORATION TOTTORI UNIVERSITY, Tottori (JP)

(72) Inventors: Yasushi Kuromi, Kyoto (JP); Masayoshi Kobayashi, Kyoto (JP); Tetsuya Ohbayashi, Tottori (JP); Takuya Aida, Tokyo (JP)

(73) Assignees: SCREEN HOLDINGS CO., LTD. (JP); NATIONAL UNIVERSITY CORPORATION TOTTORI UNIVERSITY (JP)

( * ) Notice: Subject to any disclaimer, the term of this patent is extended or adjusted under 35 U.S.C. 154(b) by 848 days.

(21) Appl. No.: 16/966,486

(22) PCT Filed: Jan. 30, 2019

(86) PCT No.: PCT/JP2019/003105
§ 371 (c)(1),
(2) Date: Jul. 31, 2020

(87) PCT Pub. No.: WO2019/151301
PCT Pub. Date: Aug. 8, 2019

(65) Prior Publication Data
US 2021/0042968 A1 Feb. 11, 2021

(30) Foreign Application Priority Data
Jan. 31, 2018 (JP) ................................. 2018-015377

(51) Int. Cl.
G06T 11/00 (2006.01)
G06T 7/70 (2017.01)
(Continued)

(52) U.S. Cl.
CPC ........ *G06T 11/005* (2013.01); *G01N 15/1475* (2013.01); *G06T 7/0012* (2013.01);
(Continued)

(58) Field of Classification Search
CPC ....... G06T 11/005; G06T 7/0012; G06T 7/70; G06T 2207/10101; G06T 2207/30024; G01N 15/1475; G01N 2015/0065
See application file for complete search history.

(56) References Cited

U.S. PATENT DOCUMENTS

| 6,615,072 B1 | 9/2003 | Izatt et al. ..... 600/478 |
| 2003/0004412 A1 | 1/2003 | Izatt et al. ..... 600/425 |

(Continued)

FOREIGN PATENT DOCUMENTS

| CN | 104520669 A | 4/2015 |
| CN | 106133503 A | 11/2016 |

(Continued)

OTHER PUBLICATIONS

Bradu et al, "Versatile confocal/optical coherence tomography system for embryonic developmental imaging" (published in Proceedings vol. 6847, Coherence Domain Optical Methods and Optical Coherence Tomography in Biomedicine XII, Feb. 2008).*

(Continued)

Primary Examiner — Casey L Kretzer
(74) Attorney, Agent, or Firm — OSTROLENK FABER LLP

(57) ABSTRACT

A technique capable of providing a user with information obtained by OCT imaging in a useful way, particularly for assisting in assessment of an embryo effectively. The image processing method includes acquiring original signal data indicating an intensity distribution of signal light from each position in three-dimensional space including a cultured embryo obtained by optical coherence tomography imaging, (Continued)

generating spherical coordinate data based on the original signal data, the spherical coordinate data indicating a relationship between each position in the three-dimensional space represented using spherical coordinates having an origin set inside the embryo and the intensity of the signal light from the position, and outputting the intensity distribution of the signal light as a two-dimensional map based on the spherical coordinate data using two deflection angles of the spherical coordinates as coordinate axes.

8 Claims, 7 Drawing Sheets

(51) Int. Cl.
    *G01N 15/14*     (2006.01)
    *G06T 7/00*     (2017.01)
    *G01N 15/00*     (2006.01)

(52) U.S. Cl.
    CPC ........ *G06T 7/70* (2017.01); *G01N 2015/0065* (2013.01); *G06T 2207/10101* (2013.01); *G06T 2207/30024* (2013.01)

(56) References Cited

U.S. PATENT DOCUMENTS

| | | | |
|---|---|---|---|
| 2008/0289578 A1 | 11/2008 | Rybarczyk, Jr. et al. | 119/6.8 |
| 2009/0096787 A1 | 4/2009 | Masumoto et al. | 345/424 |
| 2012/0189184 A1 | 7/2012 | Matsumoto et al. | 382/131 |
| 2013/0006105 A1 | 1/2013 | Furuichi | 600/427 |
| 2014/0043469 A1 | 2/2014 | Engel et al. | 348/135 |
| 2014/0043474 A1 | 2/2014 | Westphal et al. | 348/136 |
| 2014/0347672 A1 | 11/2014 | Pavillon et al. | |
| 2016/0030007 A1 | 2/2016 | Tsujita | |
| 2017/0140535 A1 | 5/2017 | Hamamah et al. | |
| 2017/0167847 A1 | 6/2017 | Ueyama et al. | |
| 2017/0358081 A1 | 12/2017 | Tsumura | |
| 2019/0244349 A1 | 8/2019 | Senda et al. | |

FOREIGN PATENT DOCUMENTS

| | | |
|---|---|---|
| CN | 105073017 A | 11/2018 |
| JP | 2000-262461 A | 9/2000 |
| JP | 2008-259696 A | 10/2008 |
| JP | 2009-513949 A | 4/2009 |
| JP | 2012-148003 A | 8/2012 |
| JP | 2013-013439 A | 1/2013 |
| JP | 2013-066559 A | 4/2013 |
| JP | 2016-188795 A | 11/2016 |
| JP | 2017-026583 A | 2/2017 |
| JP | 2017-106849 A | 6/2017 |
| JP | 2017-521067 A | 8/2017 |
| WO | WO 2017/216930 A1 | 12/2017 |

OTHER PUBLICATIONS

Chinese Notice of Allowance, dated Apr. 22, 2023, in corresponding Chinese Application No. 201980009221.6.
International Search Report dated Mar. 19, 2019 in corresponding PCT International Application No. PCT/JP2019/003105.
Written Opinion dated Mar. 19, 2019 in corresponding PCT International Application No. PCT/JP2019/003105.
Office Action dated Nov. 3, 2022 in corresponding Chinese Application No. 201980009221.6.

* cited by examiner ated by OCT imaging. Also, this literature discloses examples of three-dimensional images of the embryo viewed from various directions. However, this literature does not state a particular way of processing an image or calculation of a quantitative index. Namely, this conventional technique was made by merely replacing a two-dimensional image such as a microscope image having been used for visual observation so far with a three-dimensional image. Hence, while this technique can be used for assisting in assessment of an embryo more effectively than in a conventional case of using a two-dimensional image, it cannot be considered to provide sufficiently effective use of information obtained from a result of OCT imaging. For example, for grasping the internal configuration of the embryo, what is required is to display images of the embryo viewed from various directions such as those illustrated in FIGS. 5A to 5I of patent literature 1, to observe these images one by one, and to make a comprehensive judgment.

IMAGE PROCESSING METHOD FOR A COMPUTER TO ASSIST A USER IN ASSESSMENT OF A CULTURED EMBRYO

CROSS-REFERENCE TO RELATED APPLICATIONS

The present application is a 35 U.S.C. §§ 371 national phase conversion of International Application No. PCT/JP2019/003105, filed Jan. 30, 2019, which claims priority to Japanese Patent Application No. 2018-015377, filed Jan. 31, 2018, the contents of both of which are incorporated herein by reference. The PCT International Application was published in the Japanese language.

TECHNICAL FIELD

The present invention relates to an image processing technique for expressing data corresponding to a three-dimensional image of an embryo obtained by tomographic imaging of the embryo in a two-dimensional manner. Particularly, the invention relates to the image processing suitable for assisting in assessment of the embryo.

BACKGROUND ART

In assisted reproductive technologies intended for fertility treatment, for example, after an embryo resulting from external fertilization (fertilized egg) is cultured for a certain period of time, the embryo is returned into a womb. However, this does not always result in a high success rate while imposing heavy psychological and economical burdens on a patient. To solve this problem, effort has been made to find a method of correctly judging the condition of an embryo to be cultured.

An assessment of whether embryo culture proceeds favorably has conventionally been made, generally by a doctor or a clinical embryologist through visual inspection using a microscope, for example. As indexes to this judgment, Veeck classification or Gardner classification has widely been used, for example. However, these classifications merely provide rough judgment criteria for morphological features of an embryo. Under present circumstances, a final assessment is made depending on a subjective judgment by a person to make the assessment. Hence, a technique for allowing making of an objective and quantitative judgment has been desired.

As an example, patent literature 1 suggests a technique of assessing the quality of an embryo by applying non-invasive tomographic imaging technology such as optical coherence tomography (OCT). According to this technique, a three-dimensional image of the embryo is reconstructed from a tomographic image obtained by OCT imaging. Then, on the basis of the reconstructed three-dimensional image, the quality of the embryo is assessed using criteria that are morphological criteria for the embryo such as the number of blastomeres, blastomere regularity, and a fragmentation rate.

CITATION LIST

Patent Literature

[PTL 1] JP2017-521067

SUMMARY

Technical Problem

The foregoing literature states that assessment of an embryo is feasible on the basis of a three-dimensional image As described above, a tomographic image obtained by OCT imaging and a three-dimensional image constructed from the tomographic image have the potential to provide much useful information for assessment of an embryo in terms of the internal configuration of the embryo, for example. However, a specific method of presenting such pieces of information in an easy-to-understand way has yet to be established so far.

Solution to Problem

The present invention has been made in view of the foregoing problem, and is intended to provide a technique capable of providing a user with information obtained by OCT imaging in a useful way, particularly for assisting in assessment of an embryo effectively.

One aspect according to the present invention is directed to an image processing method comprising: acquiring original signal data indicating an intensity distribution of signal light from each position in three-dimensional space including a cultured embryo obtained by optical coherence tomography imaging; generating spherical coordinate data based on the original signal data, the spherical coordinate data indicating a relationship between each position in the three-dimensional space represented using spherical coordinates having an origin set inside the embryo and the intensity of the signal light from the position; and outputting the intensity distribution of the signal light as a two-dimensional map based on the spherical coordinate data. The two-dimensional map uses two deflection angles of the spherical coordinates as coordinate axes.

Another aspect of the present invention is directed to a program for causing a computer to perform each of the foregoing steps. Another aspect of the present invention is directed to a computer-readable recording medium recording the program.

As will be described in detail later, an embryo, particularly, a fertilized egg of a mammal has a practically spherical outer shape. The internal configuration thereof also generally has relatively high rotational symmetry. This shows that expressing each position of the embryo in a three-dimensional image using the spherical coordinates having the origin set inside the embryo is strongly rational. More specifically, with the coordinates of each position inside the embryo expressed in a spherical coordinate system, checking the intensity of signal light from each position of the embryo in one moving radius direction makes it possible to see the internal configuration of the embryo from the interior to the surface of the embryo.

Determining a way of providing a user with useful information such as that described above becomes an issue in assisting in assessment of an embryo by the user effectively. For example, on a two-dimensional map using two deflection angles of spherical coordinates as coordinate axes, an intensity distribution of signal light in one moving radius direction expressed by a set of these deflection angles can be expressed at each point on this map. Such a two-dimensional map directly shows information about the internal configuration of the embryo such as the configuration of the embryo in each moving radius direction viewed from the origin or a degree of symmetry with respect to the origin, for example. Thus, the user is allowed to grasp the internal configuration of the embryo easily at first sight of the map.

Advantageous Effects of Invention

As described above, the present invention allows provision of information obtained by OCT imaging of a cultured embryo in a useful way to a user, particularly for assisting in assessment of the embryo effectively.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DESCRIPTION OF EMBODIMENTS

A specific embodiment of an image processing method according to the present invention will be described below. This embodiment is the realization of the image processing method according to the present invention. In this embodiment, an embryo cultured in a culture medium (culture solution) carried in a culture container is tomographically imaged by optical coherence tomography (OCT) technology. On the basis of data obtained by the imaging, a three-dimensional internal structure of the embryo is outputted for displaying as a two-dimensional map. This embodiment is intended to assist in assessment of the embryo by a user (more specifically, by a doctor or a clinical embryologist). For example, the image processing method of this embodiment is applicable to culture of a fertilized egg for assisted reproductive technologies with the intention of acquiring knowledge for judging whether the culture proceeds favorably.

The configuration of an image processing apparatus for imaging of obtaining a tomographic image and the principles of the imaging by the image processing apparatus will be described first. Image processing to generate the two-dimensional map using data acquired by the imaging will be described next.

Figure 1:
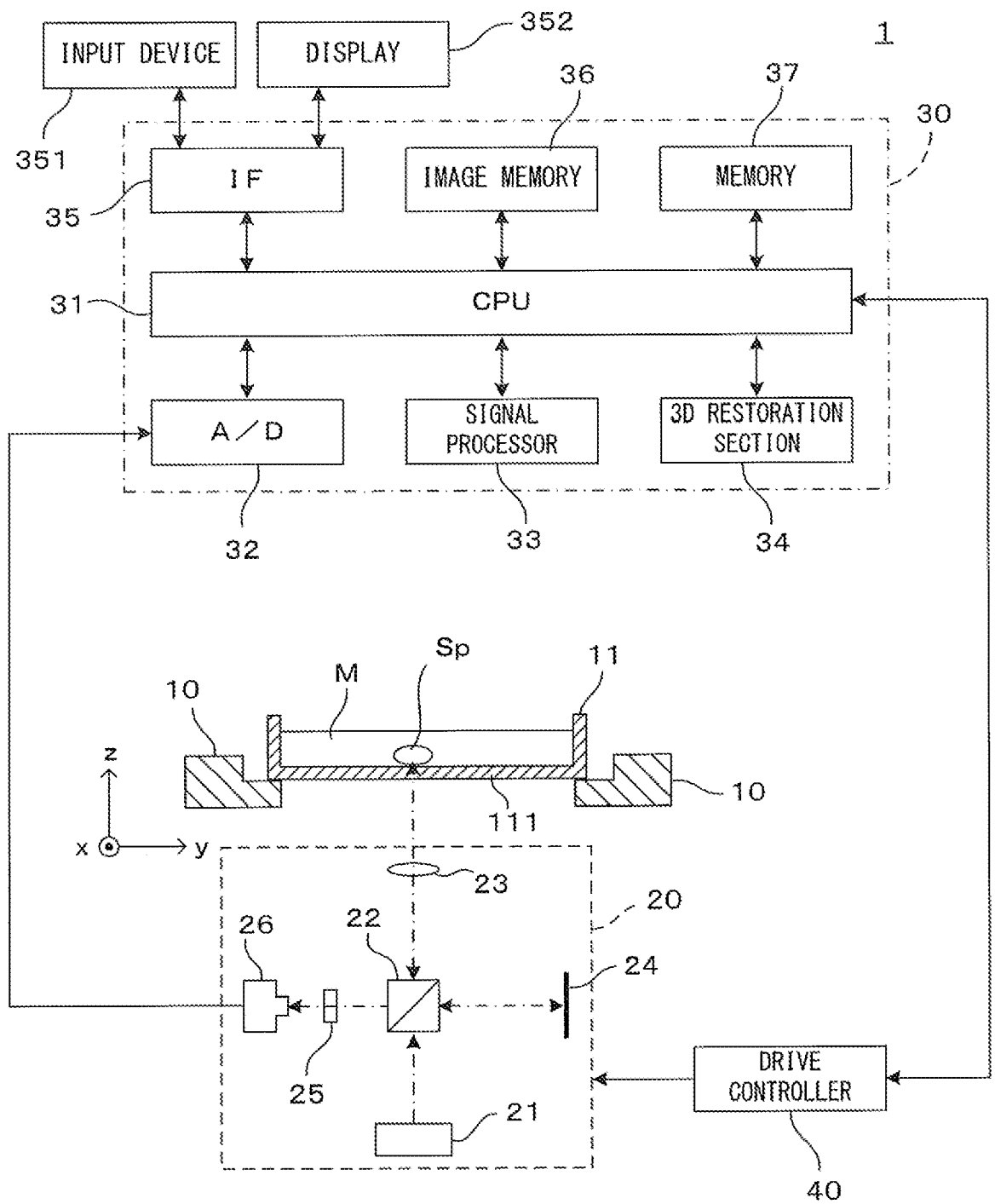
FIG. 1 is a drawing showing a constructional example of an image processing apparatus for tomographic imaging.

FIG. 1 is a drawing showing a constructional example of an image processing apparatus for tomographic imaging. The image processing apparatus 1 tomographically images an embryo cultured in a culture medium as an imaging object, processes the obtained tomographic image and generates a three-dimensional (3D) image of the imaging object. For unified presentation of the directions in drawings, the XYZ orthogonal coordinate axes are established as shown in FIG. 1. The XY plane is a horizontal surface. The Z axis represents the vertical axis, in more detail, the (−Z) direction represents the vertically downward direction.

The image processing apparatus 1 comprises a holder 10. The holder 10 holds a culture container 11 in an approximately horizontal posture in such a manner that its opening is directed toward above. The culture container (hereinafter, simply referred to as "container") 11 is called a "dish" or a "plate" having a flat bottom surface made of transparent and uniform glass or resin. A predetermined amount of an appropriate culture medium M is poured in the container 11 in advance, and a sample Sp (an embryo in this embodiment) is cultured in the medium at the bottom part 111 of the container 11. Although FIG. 1 shows only one sample Sp, a plurality of samples Sp may be cultured in one container 11.

An imaging unit 20 is disposed below the container 11 which is held by the holder 10. An optical coherence tomography (OCT) apparatus capable of imaging tomographic images of an imaging object in a non-contact and non-destructive (non-invasive) manner is used as the imaging unit 20. As described in detail later, the imaging unit 20 which is an OCT apparatus comprises a light source 21 which emits illumination light for an imaging object, a beam splitter 22, an objective optical system 23, a reference mirror 24, a spectroscope 25 and a photo-detector 26.

Further, the image processing apparatus 1 comprises a control unit 30 which controls operations of the apparatus and a drive controller 40 which controls movement of movable parts of the imaging unit 20. The control unit 30 comprises a CPU (Central Processing Unit) 31, an A/D convertor 32, a signal processor 33, a 3D restoration section 34, an interface (IF) section 35, an image memory 36 and a memory 37.

The CPU 31 governs operations of the entire apparatus by executing a predetermined control program. The control program executed by the CPU 31 and data which are generated during processing are saved in the memory 37. The A/D convertor 32 converts a signal which the photo-detector 26 of the imaging unit 20 outputs in accordance with the amount of received light into digital image data. The signal processor 33 performs image processing described later based upon a digital data outputted from the A/D converter 32, thereby generates a tomographic image of the imaging object. Based upon image data of a plurality of tomographic images, the 3D restoration section 34 generates a three-dimensional image (3D image) of the imaged embryo. The image memory 36 saves the image data of the tomographic images generated by the signal processor 33 and the image data of the stereoscopic image generated by the 3D restoration section 34. The signal processor 33 and the 3D restoration section 34 may be configured as dedicated hardware. Further, these may be realized as software by a program executed by the CPU 31.

The interface section 35 realizes communication between the image processing apparatus 1 and outside. More specifically, the interface section 35 has a function of communicating with external equipment, and a user interface function of accepting manipulation by a user and informing the user of various types of information. For this purpose, an input device 351 and a display section 352 are connected to the interface section 35. The input device 351 is for instance a key board, a mouse, a touch panel or the like which can accept manipulation and entry concerning selection of the functions of the apparatus, setting of operating conditions, etc. The display section 352 comprises a liquid crystal display for example which shows various types of processing results such as the tomographic images imaged by the imaging unit 20 and the three-dimensional image generated by the 3D restoration section 34.

Further, the CPU 31 sends a control command to the drive controller 40. The drive controller 40 makes the movable parts of the imaging unit 20 execute predetermined operation in accordance with the control command. As described next, the tomographic images of the sample (specifically, the embryo) which is the imaging object are obtained owing to combination of scan moving of the imaging unit 20 executed by the drive controller 40 and detection of the amount of the received light by the photo-detector 26.

Figure 2A:
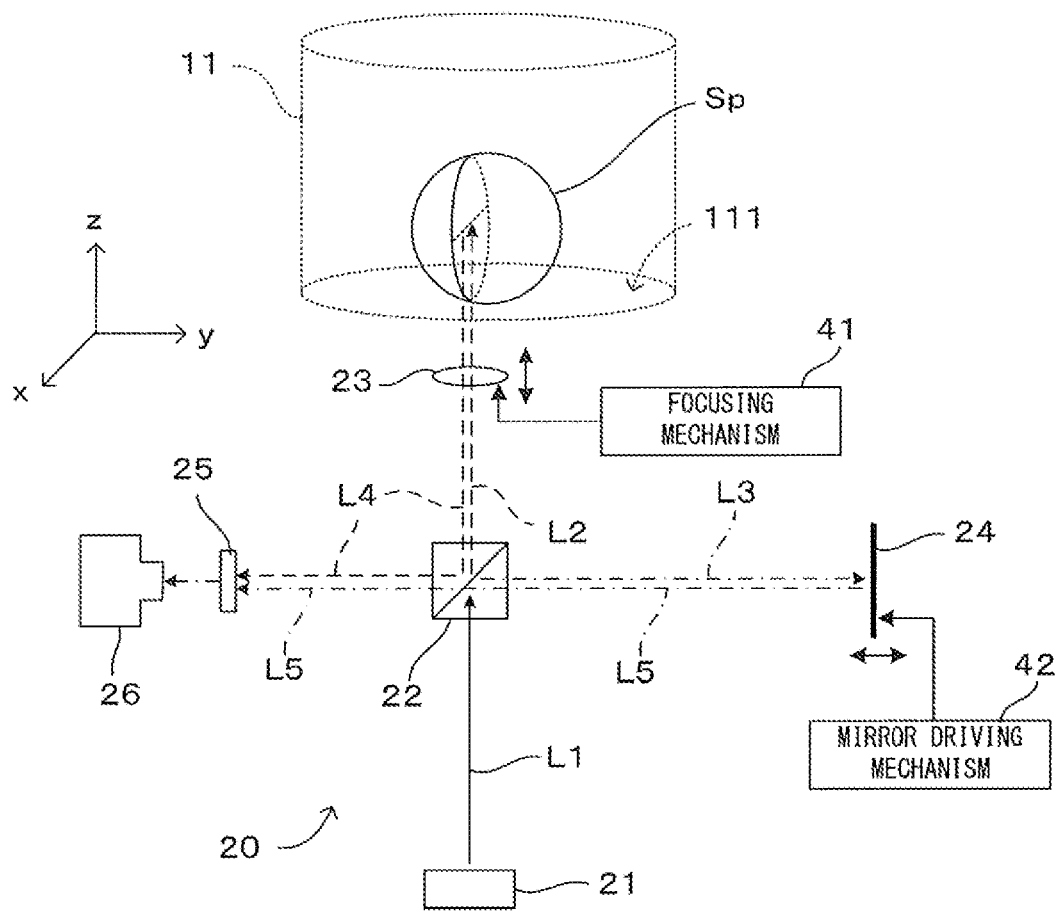
FIG. 2A is a first drawing for describing the principle of imaging in this image processing apparatus.
Figure 2B:
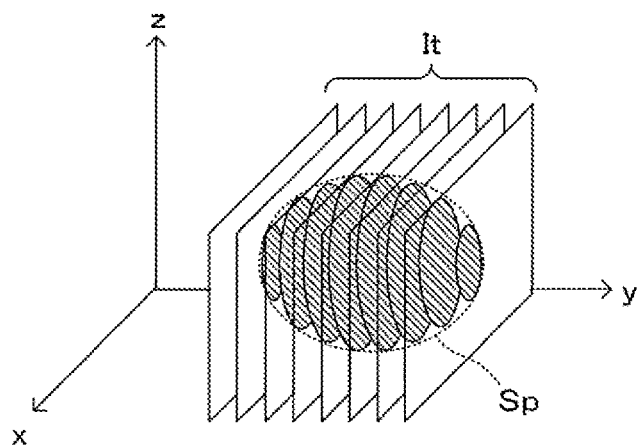
FIG. 2B is a second drawing for describing the principle of imaging in this image processing apparatus.

FIGS. 2A and 2B are drawings for describing the principle of imaging in this image processing apparatus. More specifically, FIG. 2A is a drawing which shows optical paths inside the imaging unit 20, and FIG. 2B is a schematic drawing which shows tomographic imaging of a sample. As described earlier, the imaging unit 20 works as an optical coherence tomography (OCT) apparatus. Although the sample Sp is drawn approximately as a sphere for an illustration, a shape of the sample in practical imaging is not limited to this.

In the imaging unit 20, from the light source 21 which includes a light emitting element such as a light emitting diode or a super luminescent diode (SLD) for instance, a low-coherence light beam L1 containing a wide-range wavelength components is emitted. The light beam L1 impinges upon the beam splitter 22 and diverges. Some light L2 indicated by the broken-line arrow propagates toward the container 11, and some light L3 indicated by the arrow of long dashed short dashed line propagates toward the reference mirror 24.

The light L2 propagating toward the container 11 is incident on the container 11 by way of the objective optical system 23. More specifically, the light L2 emitted from the beam splitter 22 is incident on the bottom part 111 of the container 11 via the objective optical system 23. The objective optical system 23 has a function of converging the light L2 propagating from the beam splitter 22 toward the container 11 to the sample Sp in the container 11 and a function of collecting the reflected light emitted from the sample Sp and causing it to propagate toward the beam splitter 22. Although the objective optical system 23 is illustrated as a single objective lens in FIG. 2A, the objective optical system 23 may include a plurality of optical elements.

The objective optical system 23 is movable in the Z direction by a focusing mechanism 41 which is disposed to the drive controller 40. This enables the focus position of the objective optical system 23 with respect to the imaging object to be changed in the Z direction. An optical axis of the objective optical system 23 is parallel to a vertical direction and, therefore, perpendicular to the bottom part 111 of the container 11 in the form of a flat plate. Further, an incident direction of illumination light on the objective optical system 23 is parallel to the optical axis. The arrangement of the objective optical system 23 is determined such that a light center of the light coincides with the optical axis.

The incident light L2 via the bottom part 111 is reflected at the surface of the sample Sp unless the sample Sp transmits the light beam L2. On the other hand, when the sample Sp has a property of transmitting the light beam L2 to a certain extent, the light beam L2 propagates into inside the sample Sp and is reflected by a structure element which is inside the sample. When the near infrared rays for instance are used as the light beam L2, it is possible to allow the incident light to reach even inside the sample Sp. The reflected light from the sample Sp is irradiated as scattered light in various directions. Out of that, light L4 irradiated within a light collection range of the objective optical system 23 is collected by the objective optical system 23 and sent to the beam splitter 22.

The reference minor 24 is supported in such a manner that a reflection surface thereof is perpendicular to an incident direction of the light L3. The reference minor 24 is movable in a direction (Y direction in FIG. 2A) along the incident direction of the light L3 by a minor driving mechanism 42 provided in the drive controller 40. The light L3 incident on the reference minor 24 is reflected by the reflection surface and propagates toward the beam splitter 22 as light L5 propagating in an opposite direction along an incident optical path. This light L5 becomes reference light. By changing the position of the reference mirror 24 by the mirror driving mechanism 42, an optical path length of the reference light changes.

The reflected light L4 reflected by a surface or an internal reflecting surface of the sample Sp and reference light L5 reflected by the reference mirror 24 are incident on the photo-detector 26 via the beam splitter 22. At this time, interference due to a phase difference between the reflected light L4 and the reference light L5 occurs, but an optical spectrum of interference light differs depending on a depth of the reflecting surface. That is, the optical spectrum of the interference light has information on a depth direction of the imaging object. Thus, a reflected light intensity distribution in the depth direction of the imaging object can be obtained by spectrally diffracting the interference light at each wavelength to detect a light quantity and Fourier transforming a detected interference signal. An OCT imaging technique based on such a principle is called Fourier domain OCT (FD-OCT).

The imaging unit 20 of this embodiment is provided with a spectroscope 25 on an optical path of the interference light from the beam splitter 22 to the photo-detector 26. A spectroscope utilizing a prism, a spectroscope utilizing a diffraction grating and the like can be, for example, used as the spectroscope 25. The interference light is spectrally diffracted for each wavelength component and received by the photo-detector 26.

By Fourier-transforming the interference signal output from the photo-detector 26 according to the interference light detected by the photo-detector 26, the reflected light intensity distribution of the sample Sp in the depth direction, i.e. in the Z direction at the incident position of the light beam L2 is obtained. By scanning the light beam L2 incident on the container 11 in the X direction, the reflected light intensity distribution in a plane parallel to an XZ plane is obtained, with the result that a tomographic image of the sample Sp having this plane as a cross-section can be generated. In this specification, a series of operations for obtaining one tomographic image It in a cross-section parallel to the XZ plane by beam scanning in the X direction is referred to as one imaging.

Images are obtained by changing the incident position of the light L2 along the Y direction over multiple steps and imaging a tomographic image for every change. As shown in FIG. 2B, a number of tomographic images It of the sample Sp are obtained along cross-sectional surfaces which are parallel to the XZ plane. As the scan pitch in the Y direction is reduced, it is possible to obtain image data with sufficient resolution to grasp the stereoscopic structure of the sample Sp. Scan movements of the light beam in X and Y direction are realized as an optical device (not shown) changing an optical path such as a Galvanometer mirror changes the incident position of the light beam to X and Y direction. Further, a process in which the container 11 carrying the sample Sp and imaging unit 20 relatively move to X and Y direction is also applicable.

Note that, in the imaging unit 20 of the above description, it is the beam splitter 22 that has a function of dividing the light from the light source 21 to the illumination light and the reference light and a function of mixing the signal light and the reference light to cause interference. On the other hand, some of OCT image processing apparatuses are known to have a dividing/mixing function, for example, an optical fiber coupler as described below.

Figure 3A:
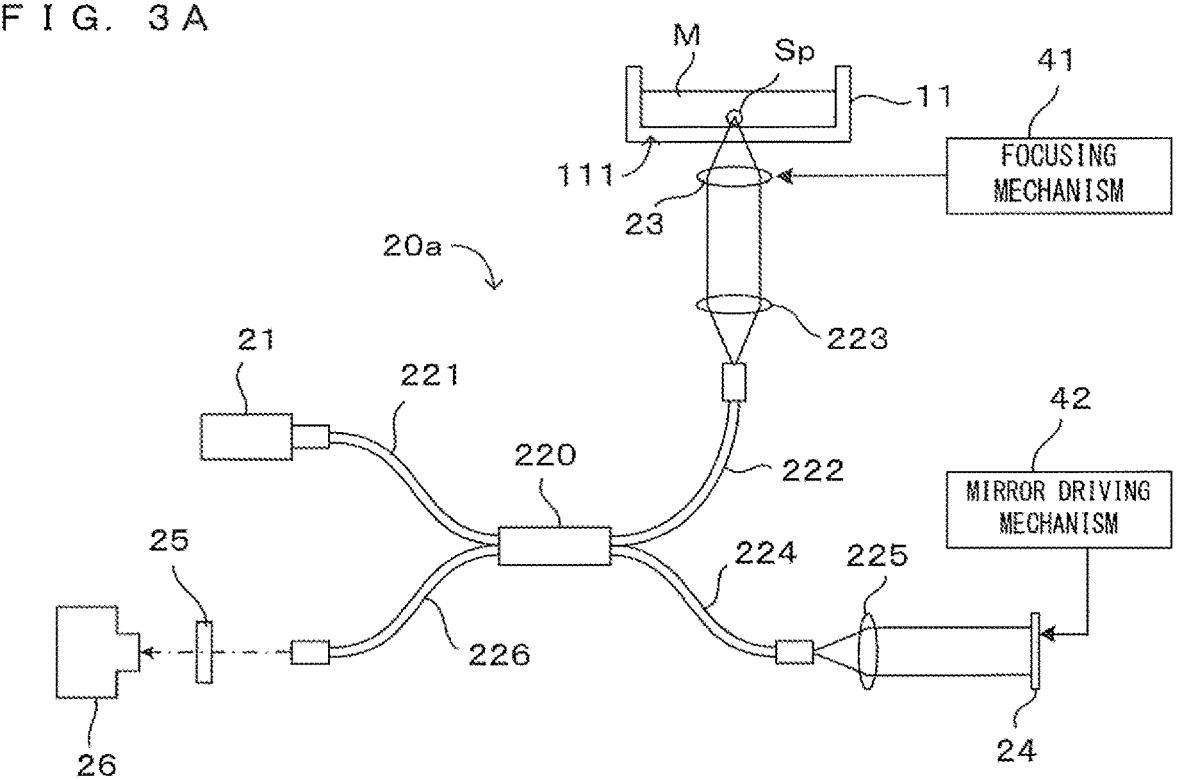
FIG. 3A is a first diagram showing other configuration example of the OCT apparatus.
Figure 3B:
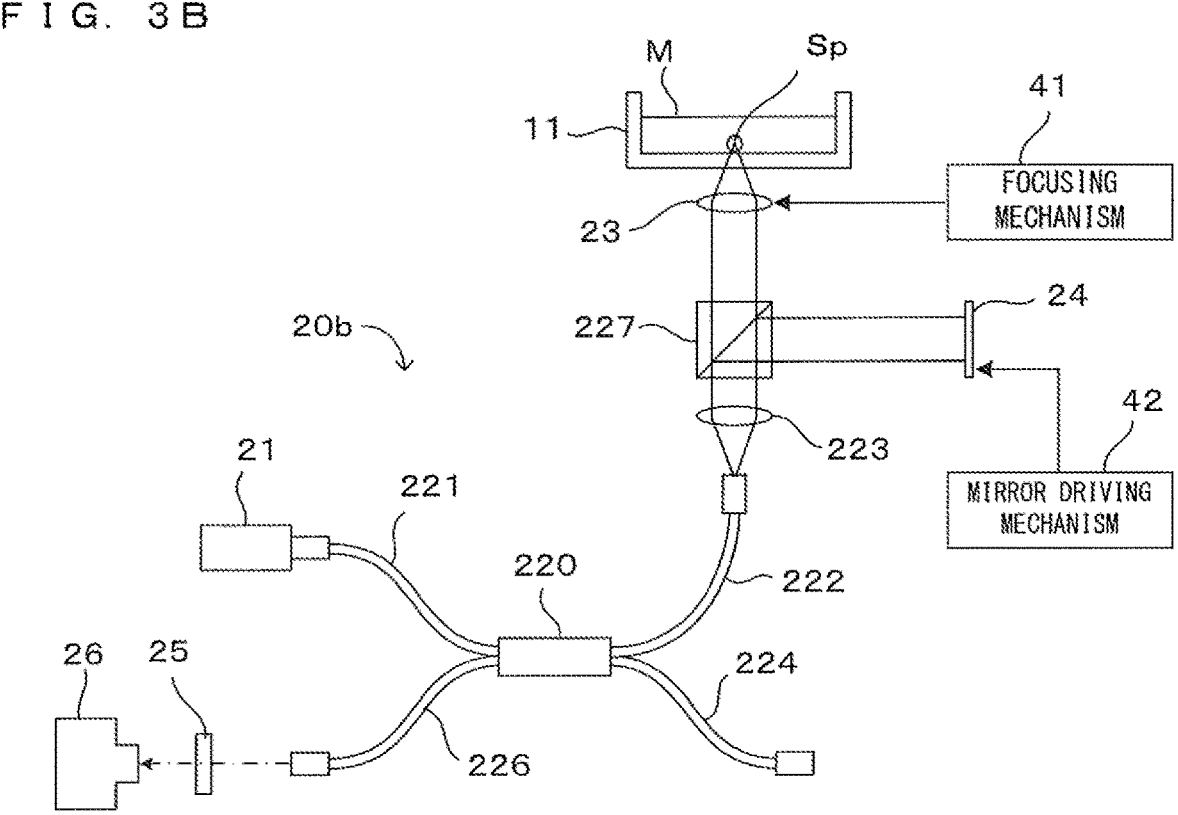
FIG. 3B is a second diagram showing other configuration example of the OCT apparatus.

FIGS. 3A and 3B are diagrams showing other configuration examples of the OCT apparatus. Note that, in the following description, constituent components same as or corresponding to those of other embodiments are denoted by the same reference signs to facilitate understanding. The structures and functions thereof are basically the same as those of the embodiment unless particularly described, and thereby the detail description is omitted. An OCT imaging principle for detecting interference light by the optical fiber coupler is not described in detail since it is same as the above embodiment.

In an example shown in FIG. 3A, an imaging unit 20a includes an optical fiber coupler 220 instead of the beam splitter 22 as a dividing/mixing optical device. One 221 of optical fibers constituting the optical fiber coupler 220 is connected to a light source 21 and low-coherence light emitted from the light source 21 is branched into lights to two optical fibers 222, 224 by the optical fiber coupler 220. The optical fiber 222 constitutes an object side optical path. More specifically, light emitted from an end part of the optical fiber 222 is incident on an objective optical system 23 via a collimator lens 223. Reflected light (signal light) from an imaging object is incident on the optical fiber 222 via the objective optical system 23 and the collimator lens 223.

Another optical fiber 224 constitutes a reference side optical path. More specifically, light emitted from an end part of the optical fiber 224 is incident on a reference mirror 24 via a collimator lens 225. Reflected light (reference light) from the reference mirror 24 is incident on the optical fiber 224 via the collimator lens 225. The signal light propagating in the optical fiber 222 and the reference light propagating in the optical fiber 224 interfere in the optical fiber coupler 220. The interference light is incident on a photo-detector 26 via an optical fiber 226 and a spectroscope 25. An intensity distribution of the reflected light on the imaging object is obtained from the interference light received from the photo-detector 26 as in the above principle.

Also in an example shown in FIG. 3B, an optical fiber coupler 220 is provided in an imaging unit 20b. However, an optical fiber 224 is not used and a collimator lens 223 and a beam splitter 227 as an optical device are provided on an optical path of light emitted from an optical fiber 222. As the principle described above, an objective optical system 23 and a reference mirror 24 are arranged on two optical paths branched by the beam splitter 227. In such a configuration, signal light and reference light are mixed by the beam splitter 227. Interference light generated thereby is guided to a photo-detector 26 through the optical fibers 222, 226.

In these examples, the optical path of each light propagating in a space is partially replaced by an optical fiber in the principle diagram of FIG. 2A, but the operation principle is the same. Also in these examples, the focusing mechanism 41 moves the objective optical system 23 in directions toward and away from the container 11, whereby a focal depth of an objective optical system 23 with respect to the imaging object can be adjusted. Further, the mirror driving mechanism 42 moves the reference mirror 24 along the incident direction of the light, whereby the optical path length of the reference light can be changed.

An imaging operation by this image processing apparatus 1 is described below. The same imaging operation can be performed regardless of the configuration of the imaging unit using the beam splitter described above or that using an optical fiber coupler. Further, an imaging apparatus for tomographic imaging is not limited to the above mentioned FD-OCT imaging apparatus. For example, an image processing apparatus such as a time-domain OCT (TD-OCT) based on different imaging principles is also applicable. In the image processing method described below, reflected light of illumination light incident on each position in three-dimensional space including the sample Sp and its surrounding is used as signal light. Data containing association between a position in the three-dimensional space and signal intensity corresponding to the quantity of the signal light from this position is used for the processing. Thus, any imaging method available for use for acquiring such data is applicable.

FIGS. 4A through 4D are schematic views illustrating representative configurations of embryos to be processed. When the image processing apparatus 1 is used for fertility treatment, for example, a fertilized egg resulting from external fertilization and in an initial stage of culture is an imaging object by the image processing apparatus 1. As is already known, after an egg is fertilized, cleavage starts. After a state called a morula is passed, a blastocyst is formed. The image processing method of this embodiment is to provide a user with information suitable for observation of an embryo in a period from a moment immediately after fertilization to a blastocyst stage, for example.

Figure 4A:
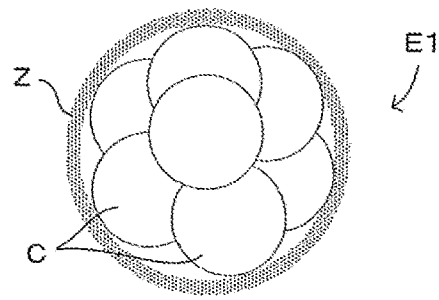
FIG. 4A is a first schematic view illustrating a representative configuration of embryos to be processed.
Figure 4B:
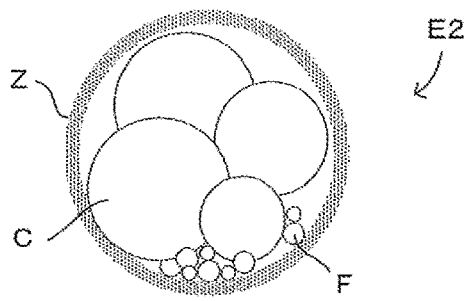
FIG. 4B is a second schematic view illustrating a representative configuration of embryos to be processed.

FIG. 4A schematically shows the configuration of an embryo in an initial stage (in a period from a four-cell stage to a morula stage, for example). An embryo E1 has a practically spherical outer shape. The surface of the embryo E1 is covered by a jelly glycoprotein layer Z called a pellucid zone. A plurality of cells C formed by cell division of a fertilized egg is included inside the embryo E1. As shown in FIG. 4A, if culture proceeds favorably, the interior of the pellucid zone Z is occupied by the cells C of uniform size. As cleavage proceeds further, the number of the cells increases. Veeck classification defines that there is desirably uniformity between these cells. By contrast, if the culture does not proceed in a favorable condition, non-uniformity may be caused between the sizes of the cells C or tiny pieces called fragments may be caused in addition to the cells C formed by the cleavage, like in an embryo E2 shown in FIG. 4B. While FIG. 4B shows the occurrences of both the non-uniformity of the sizes of the cells C and fragments F, only one of these may occur.

In either case, this condition of the embryo is determined to be inferior to that shown in FIG. 4A. Thus, regarding an initial embryo up to a morula stage, indexes for assessment of a culture condition may be whether the sizes of the cells C formed by cleavage are uniform, whether the surface of each cell C is smooth, whether the fragment F has occurred, and others.

Figure 4C:
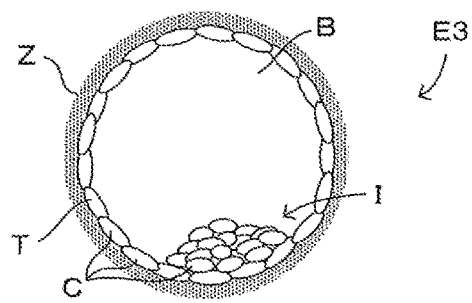
FIG. 4C is a third schematic view illustrating a representative configuration of embryos to be processed.
Figure 4D:
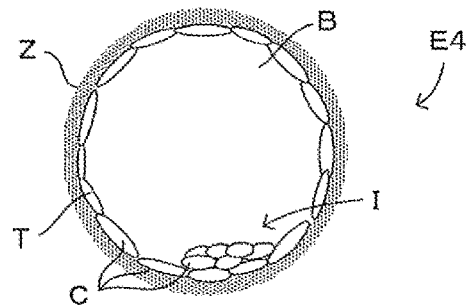
FIG. 4D is a fourth schematic view illustrating a representative configuration of embryos to be processed.

FIGS. 4C and 4D schematically show internal configurations of embryos in a blastocyst stage. FIG. 4C shows an embryo E3 in a favorable condition. FIG. 4D shows an embryo E4 in a condition inferior to that of FIG. 4C. As shown in FIG. 4C, in a blastocyst stage, the cells resulting from the development of cleavage are aligned in a thin layer along the surface of the embryo to form a trophectoderm T. A cavity called a blastocoel B is generated in internal space surrounded by the trophectoderm T. An inner cell mass I with a large number of the dense cells C is formed in a part of the internal space.

In the embryo E3 in a good condition, the trophectoderm T is formed of a large number of the dense cells C, and the inner cell mass I is also formed of a relatively large number of the cells C. By contrast, in the embryo E4 in a condition inferior to that of the embryo E3, the trophectoderm T may be formed of a smaller number of the sparse cells C, or the inner cell mass I may be formed of a small number of cells to be reduced in size, for example. Thus, a culture condition of an embryo can be judged using an index including the thickness or density of the trophectoderm T, and the size and density of the inner cell mass I.

Figure 5:
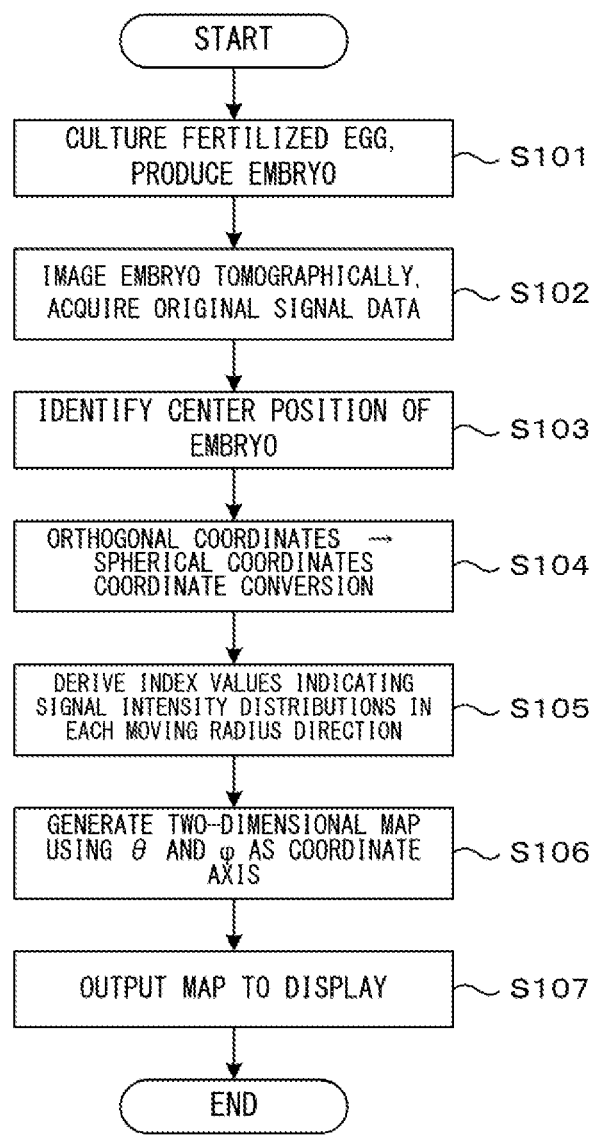
FIG. 5 is a flowchart showing the image processing method of this embodiment.

FIG. 5 is a flowchart showing the image processing method of this embodiment. Step S101, which is part of a series of processes described below, is performed in an appropriate incubator prepared separately from the image processing apparatus 1. Processes from step S102 and its subsequent steps are realized by causing the CPU 31 in the image processing apparatus 1 to execute the control program stored in advance in the memory 37. However, this is not the only way of implementing these processes.

For example, step S103 and its subsequent steps in FIG. 5 can be performed by a computer device having a general calculation function and a general image output function. In some configurations, the computer device different from the image processing apparatus 1 may receive OCT imaging data from the image processing device 1 and perform these processes. This allows the CPU 31 in the image processing device 1 to perform only the process specialized for imaging. In this way, processing load on the CPU 31 is reduced.

The details of the specific processes will be described below. First, an embryo to be assessed is cultured in an appropriate culture environment (step S101). The image processing apparatus 1 images the cultured embryo by OCT imaging at appropriate timing (step S102). Data obtained by the imaging, more specifically, data indicating the intensity of reflected light from each position in three-dimensional space including the embryo and its surrounding is stored as original signal data into the memory 37 or the image memory 36. This original signal data is used to generate pixel data (voxel data) about each coordinate position in the three-dimensional space, thereby allowing formation of a three-dimensional image of the embryo such as that shown in patent literature 1 and output of the same as an image.

Figure 6A:
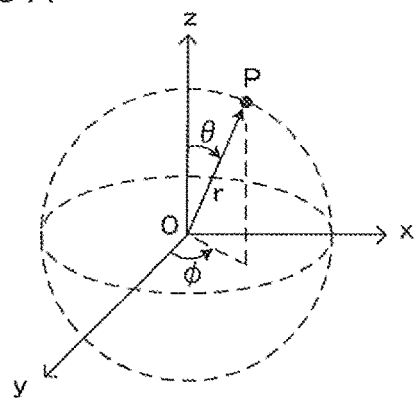
FIG. 6A is a first drawing showing an effect obtained by coordinates conversion.
Figure 6B:
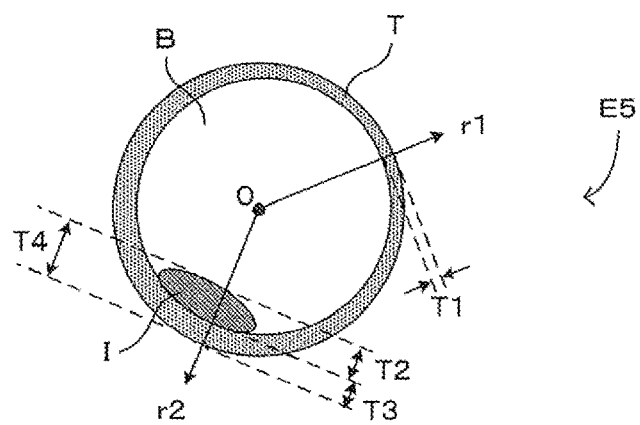
FIG. 6B is a second drawing showing an effect obtained by coordinates conversion.
Figure 6C:
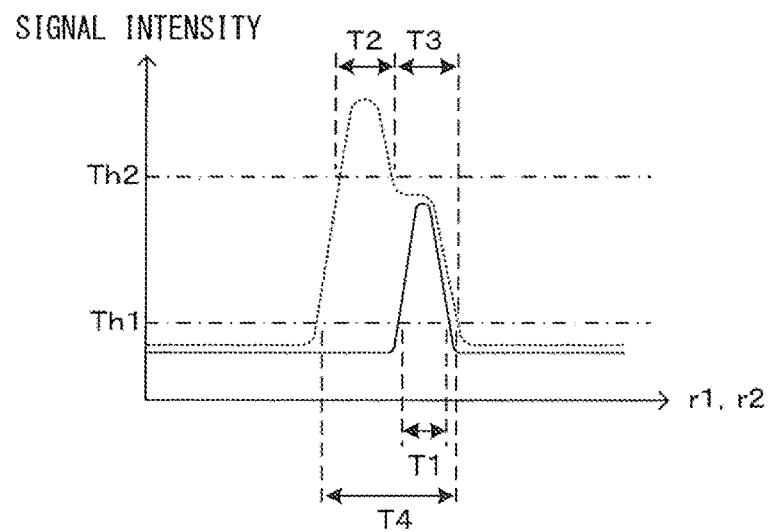
FIG. 6C is a third drawing showing an effect obtained by coordinates conversion.

FIGS. 6A through 6C are drawings showing an effect obtained by coordinates conversion. In the original image data acquired by beam scanning on an imaging object in the X and Y direction, each position in the three-dimensional space is expressed in the xyz coordinate system. However, the schematic shape of a cell can be expressed as an ellipsoid. Thus, to express the shape of the cell more directly, it is preferable to represent each position using spherical coordinates with an origin set at the center of the cell. Then, as shown in FIG. 9B, coordinate conversion is performed from the xyz orthogonal coordinate system to an rθφ spherical coordinate system using a moving radius r and two deflection angles θ and φ as coordinate variables.

As is well known, there is a relationship expressed by the following formulas between the coordinates (x, y, z) of a point P in the orthogonal coordinate system and the coordinates (r, θ, φ) of the point P in the spherical coordinate system if an origin O is common between the coordinate systems:

$x = r \cdot \sin\theta \cdot \cos\varphi,$ $y = r \cdot \sin\theta \cdot \sin\varphi,$ and $z = r \cdot \cos\theta.$ These coordinates are mutually convertible.

More specifically, a center position of the embryo is identified from the original signal data (step S103), and the identified center position is defined as the origin O of the spherical coordinate system. The origin O is not required to agree with the origin of the xyz orthogonal coordinate system in the original signal data. Then, coordinate conversion is performed from the orthogonal coordinates to the spherical coordinates through appropriate converting process (step S104). As a result of the coordinate conversion performed in this way, data (spherical coordinate data) indicating a relationship between each position in the three-dimensional space identified in the rθφ spherical coordinate system and the intensity of signal light from this position is generated from the original signal data indicating a relationship between each position in the three-dimensional space identified in the xyz orthogonal coordinate system and the intensity of signal light from this position.

The "center of an embryo" can be determined as follows, for example, on the basis of the original signal data. If a three-dimensional image of the embryo generated from the original signal data can be considered to be a solid sphere, the centroid of this sphere in an image can be regarded as the center of the embryo. A method of determining the centroid of a solid object is publicly known in three-dimensional image processing, and such a known method is applicable. In another example, a spherical surface representing the surface of the embryo approximately is identified, and the center of the approximate spherical surface can be regarded as the center of the embryo. This method is applicable to a case where the embryo has a hollow interior such as a blastocyst E5 shown in FIG. 6B, and is also applicable to a case where the embryo has a complicated internal configuration, for example.

The implementation of the foregoing coordinate conversion to the spherical coordinates makes it possible to determine an intensity distribution of signal light as viewed in each moving radius direction from the origin. Expressing an intensity distribution of signal light using the spherical coordinates provides convenience for grasping the configuration of an embryo extending in each direction as viewed from the origin. For example, the isotropy of the embryo viewed from the origin can be assessed quantitatively. For example, the thickness or density of the pellucid zone Z in each moving radius direction can be determined to assess uniformity of the pellucid zone Z. In a blastocyst, a distribution of the thickness or density can be determined in the same way for the trophectoderm T. Further, the size (thickness and extension in a radius direction) of the inner cell mass I can also be assessed. These will be described in detail next.

As shown in FIG. 6B, one moving radius direction r1 extending from the origin O is assumed in the blastocyst E5 given spherical coordinates set through the coordinate conversion. It is assumed that the inner cell mass I is absent in this direction. Moving a point of interest in the moving radius direction r1 from the origin O shows that the surrounding of the origin O is occupied by the blastocoel B, and the point of interest passes through the thin trophectoderm T to reach the outside of the embryo E5. Thus, plotting signal light intensity in this moving radius direction produces a result indicated by a solid line in FIG. 6C. More specifically, signal intensity is high at a position corresponding to a layer of the trophectoderm T, and signal intensity is reduced on the opposite sides of this layer. Namely, in a signal intensity distribution determined in this case, one peak corresponding to the trophectoderm T is observed.

This peak has a width that becomes greater as the thickness of the trophectoderm T becomes greater in this direction. This peak has a height that becomes greater as the density of the trophectoderm T becomes greater in this direction. As shown in FIG. 6C, by defining an appropriate threshold Th1 in advance for separating a background level and a significant peak from each other, it becomes possible to express the thickness of the trophectoderm T in the moving radius direction r1 quantitatively on the basis of a width T1 of a region in which signal intensity exceeds the threshold Th1 continuously. The density of the trophectoderm T can also be expressed on the basis of the height of the peak.

In the presence of another structure in the moving radius direction r1 different from the trophectoderm T, the position of this presence is also considered to be a position of increased signal intensity. A peak position indicates a distance of this structure from the origin O. A total content of structures existing in the moving radius direction r1 can be expressed using a value of integral of signal intensity in this direction.

It is assumed that there is a direction r2 in which the inner cell mass I exists, which is another moving radius direction different from the moving radius direction r1. A signal intensity distribution in this direction includes a component corresponding to signal light from the inner cell mass I and a component corresponding to signal light from the trophectoderm T. Namely, plotting signal intensity in this direction produces a result indicated by a dotted line in FIG. 6C. More specifically, this plot has a shape with a peak corresponding to the inner cell mass I and a peak corresponding to the trophectoderm T superimposed on each other. The presence of a difference in density between the inner cell mass I and the trophectoderm T is considered to result in corresponding change in peak height.

In this regard, by extracting a region in which the threshold Th1 for separating the background level and the significant peak from each other is exceeded continuously, a width T4 of this region is determined to be a width as a sum of the inner cell mas I and the trophectoderm T. On the assumption that density is higher at the inner cell mass I than at the trophectoderm T, for example, a threshold Th2 is settable for separating signal intensity corresponding to the inner cell mass I and signal intensity corresponding to the trophectoderm T from each other. Using the threshold Th2 makes it possible to determine a width T2 of the inner cell mass I and a width T3 of the trophectoderm T individually in the direction r2.

As described above, a distribution form of signal intensity in each moving radius direction is available for use for estimating the three-dimensional configuration of an embryo. If each of the position, height, and width of a peak observed in a signal intensity distribution is substantially constant in each moving radius direction, for example, it can be said that the isotropy of the embryo viewed from the origin O is high. By contrast, if any one of the position, height, and width of the peak in a particular direction is significantly greater than that in another direction, it can be said that a peculiar configuration is present in this particular direction.

Index values indicating signal intensity distributions quantitatively in corresponding moving radius directions such as those described above are derived as scalar quantities (step S105), and are complied and visualized on a single two-dimensional map (step S106). This achieves image display allowing grasping of the internal configuration of the embryo at a glance without requiring observation of the three-dimensional image from various directions. The coordinate axes of the two-dimensional map can be two deflection angles $\theta$ and $\varphi$, for example. Namely, one point identified by a set of the two deflection angles $\theta$ and $\varphi$ on this map indicates one moving radius direction having coordinate values expressed by the values of these deflection angles.

A method applicable to a method of expressing a signal intensity distribution in one moving radius direction as a scalar quantity uses the width of a region in which signal intensity in this direction exceeds a threshold, a peak height of the signal intensity, or a value of integral of the signal intensity as described above, for example. Using the region width achieves representation of a distribution of a structure thickness in each direction. Using the peak height or value of integral of the signal intensity achieves representation of a distribution of structure density in each direction.

These scalar quantities may be expressed on a two-dimensional map by the following methods: a method of binarizing a scalar quantity value with a predetermined threshold and expressing the scalar quantity as a binarized image; a method of making a difference in tone or contrast between points on a map in response to a scalar quantity value; and a method of placing objects (circles, for example) on a map having shapes or sizes differing in response to a scalar quantity value. In this way, by selecting a scalar quantity indicating a signal intensity distribution in a moving radius direction and selecting a method of expressing the selected scalar quantity appropriately in response to a purpose, it becomes possible to generate a two-dimensional map expressing a signal intensity distribution in each direction using the two deflection angles θ and φ as coordinate axes.

For example, a pseudo-cylindrical projection is available for use for mapping each direction expressed using spherical coordinates on a two-dimensional plane. Specifically, with the two deflection angles θ and φ assumed as latitude and longitude respectively, a drawing method similar to that for expressing the geographic features of the surface of the Earth having a practically spherical shape on a planar map is applicable. There are some known methods for such drawing, and an appropriate one responsive to a purpose is selectable.

Each element in the image processing described above becomes feasible by means of a general three-dimensional image processing application already used practically. A two-dimensional map thereby generated is output for display on the display section 352, for example, to be presented to a user (step S107). This allows the user to grasp the condition of the embryo simply and correctly by seeing the displayed map.

Figure 7A:
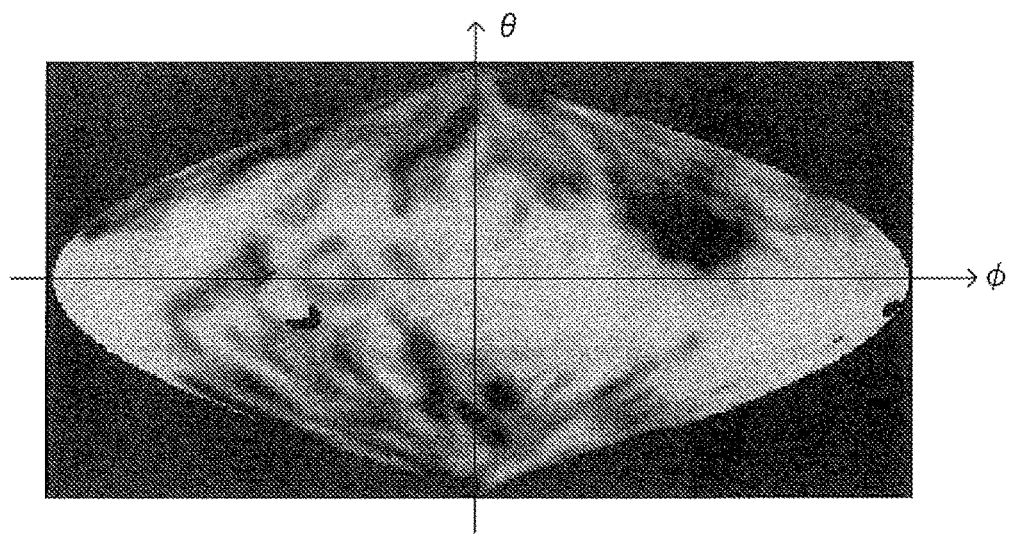
FIG. 7A is a first drawing showing an example of the two-dimensional map.
Figure 7B:
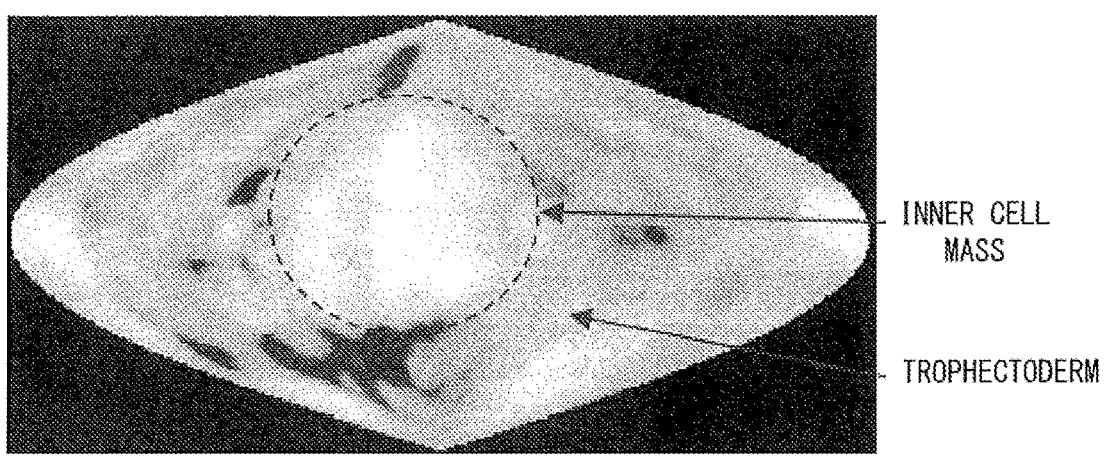
FIG. 7B is a second drawing showing an example of the two-dimensional map.

FIGS. 7A and 7B show examples of two-dimensional maps. FIG. 7A is an example of a map expressing a thickness distribution of the pellucid zone Z in an initial embryo. In this example, the deflection angle θ is used as latitude and the deflection angle φ is used as longitude. This example uses the Sanson-Flamsteed projection, which is a map drawing method allowing the area of a substance to be maintained on a map. Higher brightness shows a greater thickness of the pellucid zone Z. It can be said that the thickness of the pellucid zone Z is uniform if the map is expressed with even brightness. In this example, however, a region of high brightness (high lightness) is observed in a part around a left end of the drawing, showing that the pellucid zone Z is thick particularly in this part. A dark region (of low lightness) is observed in a part to the right of the center, showing that the pellucid zone Z is thin in this part.

As described above, while a thickness distribution of the pellucid zone Z cannot be found unless a three-dimensional image is observed from various directions according to the conventional technique, this embodiment allows this thickness distribution to be expressed using tone (or contrast) in a single two-dimensional map.

FIG. 7B is an example of a map expressing a thickness distribution of the surface of a blastocyst. This map is produced by the same method as the example in FIG. 7A. In this map, the inner cell mass I and the trophectoderm T are expressed simply by showing the thicknesses of structures using brightness at each position without being specifically distinguished from each other. A large region of high brightness is observed in a central part (a part surrounded by dashes) in the drawing, showing that there is a structure thicker than the other part. This part is considered to correspond to the inner cell mass I. In the other region, brightness unevenness is relatively small. However, a part darker or brighter than its surrounding is observed locally, showing that there is unevenness in the thickness of the trophectoderm T.

Conventionally, the internal configuration of an embryo has not been shown only through observation of the surface of the embryo in a two-dimensional image or a three-dimensional image, but visualization thereof has been achieved only after implementation of further processing on the three-dimensional image (by erasing a surface structure on the image, for example). By contrast, this embodiment allows representation of the internal configuration of the embryo using tone (or contrast) in a single two-dimensional map. More detailed information about each structure in terms of more specific shape, size, etc. can be acquired through observation of the three-dimensional image used in combination, for example.

As described above, in this embodiment, spherical coordinate data expressing the intensity of a signal from each position in three-dimensional space including an embryo using spherical coordinates is generated from original signal data obtained by OCT imaging of the embryo. The embryo is practically spherical, and the internal configuration of the embryo also generally has relatively high rotational symmetry with respect to the center of the configuration. This shows that designating a coordinate position using spherical coordinates having an origin inside the embryo and then expressing a signal intensity distribution is considerably beneficial for expressing the configuration of the embryo quantitatively.

While a three-dimensional image of the embryo can be reconstructed from imaging data resulting from OCT imaging, a user is required to observe the three-dimensional image from various directions for grasping the internal configuration of the embryo. In some cases, the three-dimensional image is required to be processed by imaging processing such as erasing of an outer structure. Further, it is hard to acquire quantitative information directly such as the size of a structure by merely observing an image.

By contrast, by expressing a signal intensity distribution using polar coordinates with an origin set at the center or its vicinity of the embryo, for example, it becomes possible to easily derive quantitative information from a profile of the distribution such as the position, size, density, etc. of a structure in each moving radius direction. Also, a derived result can be used for grasping a distribution condition of a structure in each moving radius direction, thereby allowing assessment of the embryo in terms of isotropy, for example.

The foregoing quantitative information can be expressed visually by various methods. In one example of such methods, one scalar quantity is derived from a signal intensity distribution in one moving radius direction, and the derived scalar quantity is mapped as an index value indicating a signal intensity distribution in this moving radius direction on a two-dimensional map using coordinate axes that are two deflection angles of spherical coordinates. This method allows a distribution condition of a structure in an embryo having a three-dimensional configuration to be visualized as a single map.

Displaying or outputting such a map as an image allows a user to easily grasp the condition of the embryo. In this way, the image processing method of this embodiment is available for use for effectively assisting in assessment of the embryo by the user.

The invention is not limited to the foregoing embodiment but various changes other than those described above can be made without departing from the gist of the invention. For example, the image processing apparatus 1 of the foregoing embodiment has the function of OCT imaging the sample Sp, and the function of generating an output image from imaging data and outputting the generated image. However, the image processing method of the present invention can also be implemented by a computer device not having its own imaging function but to acquire imaging data obtained by imaging by a different apparatus having an imaging function.

To achieve this, the present invention may be carried out as a software program for causing the computer device to perform steps from step S102 to S107 of all the process steps in FIG. 5. Note that the display in step S107 may be executed by a display device which is different from the computer device. In this case, the computer device may output the image data corresponding to the image to be displayed to the display device.

Such a program can be distributed in a form of downloading the program through a telecommunication line such as the Internet, for example. Alternatively, the program may be distributed by distributing a computer-readable storage medium storing this program. In another case, the present invention can be carried out using an existing OCT image processing apparatus by causing this image processing apparatus to read the program through an interface.

The two-dimensional map illustrated in the foregoing embodiment is generated by using the thickness of a structure as an index value determined from a signal intensity distribution in each moving radius direction, and mapping the determined thickness while applying the Sanson-Flamsteed projection as one of map drawing methods. An intention of this method is that the areas of structures drawn on a map have extensions relative to each other same as those of corresponding actual structures, thereby allowing grasping of the sizes of the structures intuitively. However, an index value and a method of displaying the same are not limited to these. For example, a map may be generated by an appropriate drawing method in response to a purpose such as expressing the position or shape of a structure more correctly.

In the foregoing embodiment, the thickness of a structure in each moving radius direction is expressed by brightness at a point on a map. By doing so, an estimation can be made that the bright region at the central part in FIG. 7B corresponds to the inner cell mass I, for example. As an alternative to this, a method of expression described below is applicable, for example. It is assumed that the inner cell mass I has higher density than a different structure in an embryo, for example. In this case, in a signal intensity distribution in each moving radius direction, it is considered that signal intensity observed at a position corresponding to the high-density inner cell mass I is higher than signal intensity corresponding to the different structure (trophectoderm T, for example). In this regard, a point on the map corresponding to a moving radius direction in which signal intensity higher than a certain threshold (threshold Th2 shown in FIG. 6C, for example) is observed may be displayed in a different color from a point corresponding to a different moving radius direction. As a result, it becomes possible to express the density of a structure by a color on the map, and to express the thickness of the structure by brightness on the map. This achieves display allowing a user to grasp the configuration of an embryo more intuitively.

As another example, a map may be generated by using several types of index values in combination. Alternatively, for output of a plurality of maps showing index values different from each other, these maps may be aligned and displayed on one screen. These make it possible to effectively assist in assessment of the condition of an embryo comprehensively from various types of index values. In another configuration, a three-dimensional image obtained by OCT imaging may be displayed together.

As seen from the specific embodiment illustrated and described above, the image processing method according to the present invention may be configured in such a manner that the magnitude of an index value determined from the intensity of signal light from each position in one moving radius direction identified by a set of two deflection angles of spherical coordinates is expressed as a two-dimensional map. In this case, a configuration from a central part to the surface of an embryo is indicated inclusively by one index value. Mapping this index value facilitates grasping of the entire configuration of the embryo by a user. This makes it possible to eliminate the work of observing a three-dimensional image from various directions or to alleviate load involved in this work.

In this case, a relative magnitude of the index value may be expressed by tone or contrast at a point on the two-dimensional map, for example. This method of expression allows the user to grasp a schematic configuration of the embryo intuitively at first sight of the map in its entirety without the need of considering each part of the map in detail.

As another example, the index value may be a value corresponding to the length of a region in which the intensity of signal light exceeds a predetermined threshold continuously in one moving radius direction. This configuration allows the thickness of a structure existing in one moving radius direction to be expressed using the index value. As another example, the index value may be a value corresponding to a value of integral of the intensity of signal light in the region in which the intensity of signal light exceeds the predetermined threshold continuously in one moving radius direction. This configuration allows use of the index value for indicating the content of a structure existing in one moving radius direction.

The origin of spherical coordinates may be determined by a method of approximating the surface of the embryo to a spherical surface and using the center of the approximate sphere as the origin, for example. Generally, an embryo being cultured has a practically spherical outer shape. This shows that approximating the surface of the embryo to a spherical surface makes the center of the approximate spherical surface practically agree with the center of the embryo. Determining this position to be the origin of the spherical coordinates allows the coordinates of each position of the embryo to be expressed in a way suitable for various types of visualization. In some cases, the interior of the embryo is filled with divided cells. In other cases, a cavity is generated inside the embryo. The foregoing method of determining the origin is applicable to both of these cases.

As another example, the two-dimensional map may be generated using a pseudo-cylindrical projection. In expressing a spherical structure as a two-dimensional drawing, the occurrence of some distortion such as that of the shape or size of the structure is unavoidable. This problem is common to a case of displaying the surface of the Earth as a sphere on a planar map. In the field of mapmaking, various types of map drawing methods responsive to this problem have been devised, and many of these drawing methods are also applicable to generation of a two-dimensional map of an embryo. One of these methods is a pseudo-cylindrical projection. Mapping using this method achieves display of a map in which a certain condition such as a relationship between extensions of the areas of structures is maintained, for example.

INDUSTRIAL APPLICABILITY

The present invention is applicable to a purpose of assisting in assessment of the condition of a cultured embryo. For example, the present invention is available for use for increasing a success rate of external fertilization or artificial fertilization in fertility treatment.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

REFERENCE SIGN LIST 1 image processing apparatus
10 holder
20 imaging unit
21 light source
22 beam splitter
24 reference mirror
26 photo-detector
30 control unit
33 signal processor
34 3D restoration section
352 display section
Sp sample

The invention claimed is:

1. An image processing method for a computer to assist a user in assessment of a cultured embryo, the image processing method comprising:
acquiring original signal data by an imaging apparatus executing optical coherence tomography imaging or by receiving the original signal data obtained by optical coherence tomography imaging, the original signal data indicating an intensity distribution of signal light from each position in three-dimensional space including the embryo;
generating spherical coordinate data based on the original signal data, the spherical coordinate data indicating a relationship between each position in the three-dimensional space represented using spherical coordinates having an origin set inside the embryo and the intensity of the signal light from the position;
generating a two-dimensional map which represents the intensity distribution of the signal light using two deflection angles of the spherical coordinates as coordinate axes based on the spherical coordinate data; and
outputting visually the two-dimensional map on a display.

2. The image processing method according to claim 1, wherein a magnitude of an index value determined from the intensity of signal light from each position in one moving radius direction identified by a set of two deflection angles of spherical coordinates is expressed as the two-dimensional map.

3. The image processing method according to claim 2, wherein a relative magnitude of the index value is expressed by tone or contrast on the two-dimensional map.

4. The image processing method according to claim 2, wherein the index value is a value corresponding to a length of a region in which the intensity of signal light exceeds a predetermined threshold continuously in one moving radius direction.

5. The image processing method according to claim 2, wherein the index value is a value corresponding to a value of an integral of the intensity of signal light in a region in which the intensity of signal light exceeds a predetermined threshold continuously in one moving radius direction.

6. The image processing method according to claim 1, wherein a surface of the embryo is approximated to a spherical surface and a center of an approximate sphere is used as an origin of the spherical coordinates.

7. The image processing method according to claim 1, wherein the two-dimensional map is generated using a pseudo-cylindrical projection.

8. A non-transitory computer-readable recording medium having recorded therein a program for a computer to assist a user in assessment of a cultured embryo by performing an image processing including:
acquiring original signal data by receiving the original signal data obtained by optical coherence tomography imaging, the original signal data indicating an intensity distribution of signal light from each position in three-dimensional space including the embryo;
generating spherical coordinate data based on the original signal data, the spherical coordinate data indicating a relationship between each position in the three-dimensional space represented using spherical coordinates having an origin set inside the embryo and the intensity of the signal light from the position;
generating a two-dimensional map which represents the intensity distribution of the signal light using two deflection angles of the spherical coordinates as coordinate axes based on the spherical coordinate data; and
outputting visually the two-dimensional map on a display.

* * * * *